United States Patent
Rimmer

(10) Patent No.: US 8,126,963 B1
(45) Date of Patent: *Feb. 28, 2012

(54) SYSTEM AND METHOD FOR ADDING DYNAMIC INFORMATION TO DIGITALLY SIGNED MOBILE APPLICATIONS

(75) Inventor: Graeme Rimmer, Twickenham (GB)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/012,709

(22) Filed: Jan. 24, 2011

Related U.S. Application Data

(63) Continuation of application No. 12/165,396, filed on Jun. 30, 2008, now Pat. No. 7,877,461.

(51) Int. Cl.
*G06F 15/16* (2006.01)
(52) U.S. Cl. ........ 709/203; 709/217; 709/221; 709/246; 717/168; 717/174
(58) Field of Classification Search .................. 709/203, 709/217, 220, 225, 229, 246, 221; 717/100, 717/106, 120, 168, 174
See application file for complete search history.

(56) References Cited

U.S. PATENT DOCUMENTS

| | | | |
|---|---|---|---|
| 6,446,109 B2 | 9/2002 | Gupta | |
| 6,490,624 B1 | 12/2002 | Sampson et al. | |
| 6,990,513 B2 | 1/2006 | Belfiore et al. | |
| 7,013,329 B1 | 3/2006 | Paul et al. | |
| 7,051,080 B1 | 5/2006 | Paul et al. | |
| 7,206,844 B2 | 4/2007 | Gupta et al. | |
| 7,272,782 B2 | 9/2007 | Sneh | |
| 7,346,649 B1 | 3/2008 | Wong | |
| 7,480,724 B2 | 1/2009 | Zimler et al. | |
| 7,509,397 B1 | 3/2009 | Totty et al. | |
| 7,676,193 B2 | 3/2010 | Zillacus | |
| 2003/0074456 A1* | 4/2003 | Yeung et al. .................. 709/229 |
| 2003/0208562 A1 | 11/2003 | Hauck et al. | |
| 2004/0002943 A1 | 1/2004 | Merrill et al. | |
| 2005/0038869 A1 | 2/2005 | Zimler et al. | |
| 2005/0198111 A1* | 9/2005 | Lamb et al. .................... 709/203 |
| 2006/0047835 A1 | 3/2006 | Greaux | |
| 2007/0005685 A1 | 1/2007 | Chau et al. | |
| 2007/0198698 A1 | 8/2007 | Boyd et al. | |
| 2007/0259663 A1 | 11/2007 | Weintraub et al. | |

OTHER PUBLICATIONS

Nokia, "*S60 Platform: Implementing OTA Application Delivery and Protection*," Version 2.1, [online], Dec. 18, 2007, pp. 1-25, <http://sw.nokia.com/id/0157f3bb-afbd-4c44-a85a-79efe8bb953d/S60_Platform_Implementing_OTA_Application_Delivery_and_Protection_v2_1_en.pdf>, retrieved Jun. 7, 2010.

Nokia, "*DRM Developer's Guide for Nokia Devices*," Version 3.0, [online], Oct. 20, 2006, pp. 1-51, ,http://www.openmobilealliance.org/release_program/doc/Download/V1_0-20030221-C/OMA-Download-OTA-v1_0-20030221-C.pdf>, retrieved Jun. 7, 2010.

* cited by examiner

*Primary Examiner* — Michael Won
(74) *Attorney, Agent, or Firm* — Fish & Richardson P.C.

(57) ABSTRACT

Described are systems and methods for adding information to a mobile application. A mobile application is downloaded from a server to a mobile device using a web browser. A web browser cookie associated with the mobile application is stored on the mobile device. A request is sent from the mobile application to the server, where the request includes information from the stored web browser cookie. Mobile application data associated with the stored web browser cookie from the server is received by the mobile application in response to the request. The mobile application is then provided with access to the mobile application data.

20 Claims, 7 Drawing Sheets

SYSTEM AND METHOD FOR ADDING DYNAMIC INFORMATION TO DIGITALLY SIGNED MOBILE APPLICATIONS

CROSS-REFERENCE TO RELATED APPLICATION

This application is a continuation application of and claims priority to U.S. application Ser. No. 12/165,396, filed on Jun. 30, 2008, the entire disclosure of which is incorporated herein by reference.

TECHNICAL FIELD

This present disclosure relates to mobile computing and, more particularly, to adding information to digitally signed mobile applications.

BACKGROUND

Digital signatures are commonly used in connection with software applications to verify the origin of the application, as well as to ensure that the application's integrity has not been comprised since the digital signature was applied. Normally, digital signatures provide two algorithms: a private key for signing the application known only by the signing entity, and a public key, available to other entities from the signing entity or a certificate issuing authority, for verifying the signature. Digital signatures can be used to create a public key infrastructure (PKI) scheme in which an entity's public key can identify that entity's digital identity. By verifying the entity's public key with the issuer of the digital identity (e.g., the certificate authority), a level of trust can be established between the signing entity and any third parties. Digital signatures can also be used to verify the integrity of the application. After applying a digital signature to the application, any subsequent changes to the application will invalidate the digital signature. Thus, when changes are made to the application after it has been signed, the integrity of the application may be considered compromised and, in most cases, cannot be trusted.

Some mobile devices run on operating systems and mobile platforms that require applications to be associated with a valid digital signature in order to allow the application to execute. In other instances, mobile devices attempting to run unsigned applications may prompt a user for approval prior to allowing the application access to certain device resources (e.g., the device's network connection, memory, etc.). Thus, any updates or changes to a mobile application after it has been digitally signed will prevent the mobile device from executing the application. While some mobile application platforms may allow for applications to be re-signed, the time and expense associated with re-signing makes such solutions impractical in most cases.

SUMMARY

In recent years, mobile devices have evolved from simple cell phones and two-way pagers into high-powered mobile computing devices. As mobile device capabilities have increased, so have the number of developers and publishers providing mobile applications for those mobile devices. Similar to their other software, mobile applications may be frequently updated with new information intended to keep the applications current, such as new versions of the mobile applications, as well as other information generated after the application has been downloaded or installed on a mobile device. However, some mobile devices require mobile applications to have valid digital signatures before allowing the applications to run. In those instances, updates or modifications to a mobile application may invalidate the application's digital signature and prevent execution. Systems and methods can be implemented to add data and information to digitally signed mobile applications without invalidating the digital signatures.

In one general aspect, a mobile application is downloaded from a server to a mobile device using a web browser. A web browser cookie associated with the mobile application is stored on the mobile device. A request is sent from the mobile application to the server, where the request includes information from the stored web browser cookie. Mobile application data associated with the stored web browser cookie from the server is received by the mobile application in response to the request. The mobile application is then provided with access to the mobile application data.

The details of one or more embodiments of the present disclosure are set forth in the accompanying drawings and the description below. Other features of the present disclosure will be apparent from the description and drawings, and from the claims.

DETAILED DESCRIPTION

Figure 1:
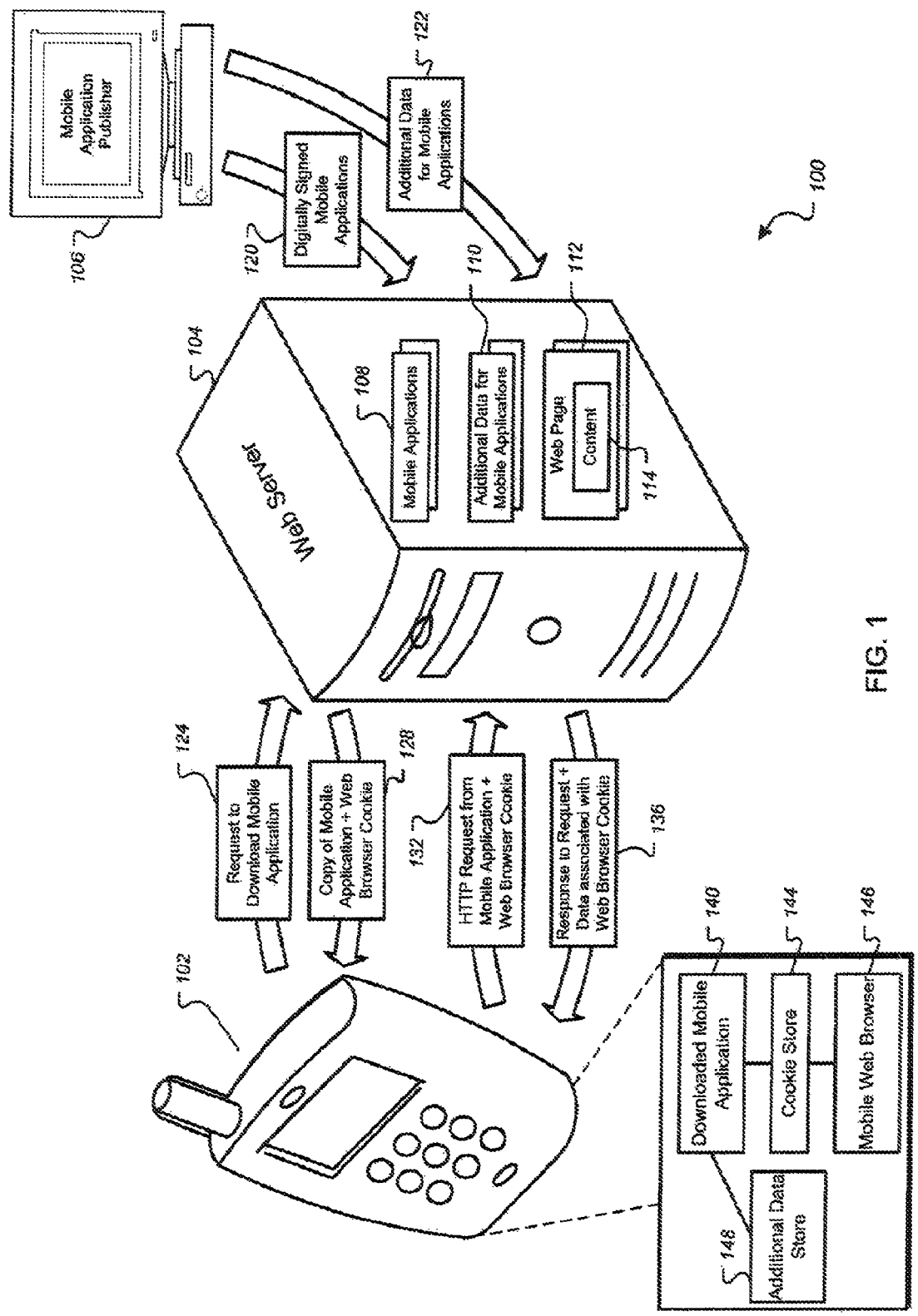
FIG. 1 shows schematically a system for adding dynamic application data to digitally signed mobile applications.

The present disclosure provides systems and techniques for adding dynamic data and other information to digitally signed mobile applications on a mobile device. As used herein, "dynamic data," "dynamic information," "dynamic application data," "additional application data," and other similar terms are intended to represent data or information associated with a mobile application that has changed or has been added, generated, customized, or otherwise altered after the mobile application has been digitally signed. FIG. 1 is a schematic diagram of a system 100 for implementing the techniques in a mobile device-server environment. The system 100 allows mobile devices 102 to download digitally signed mobile applications 108 and then, without invalidating the mobile application's digital signature, add dynamic information and data 110 for use with the application 108. By doing so, signed mobile applications can be updated in an efficient and cost-effective manner while retaining the advantages provided by a valid digital signature. Further, for mobile platforms and operating systems that require a valid digital signature for each application before it can be executed (e.g., Windows Mobile, Symbian, etc.), the present system 100 allows mobile application publishers 106 and distributors to update mobile applications 108 without requiring each application 108 to be re-signed and/or re-downloaded. Still further, the present system 100 allows downloaded mobile application 140 to be associated with dynamic data generated in response to a mobile device 102 downloading the signed application 108. For instance, information identifying a specific marketing initiative or advertising method leading a user of the mobile device 102 to download a particular mobile application 108 can be captured and used to quantify the effectiveness of particular initiatives and methods.

In FIG. 1, the system 100 includes a mobile device 102 (e.g., a cell phone) capable of navigating to one or more networks, such as the Internet. The system 100 also includes a web server 104 storing one or more web pages 112 with associated content 114 (e.g., text, images, video, etc.). Some of the web pages 112 may include links or other interactive elements that allow the mobile device 102 to download a mobile application 108. In the illustrated example, mobile applications 108 are provided by one or more mobile application publishers 106 and stored on the web server 104. In some instances, the web server 104 may be a server controlled and/or maintained by a particular mobile application publisher 106 for, among other things, distributing copies of the mobile application 108. In other instances, the web server 104 may be controlled by a third-party authorized to distribute mobile applications 108 on behalf of one or more application publishers 106.

As shown by arrow 120, the mobile application publisher 106 provides one or more digitally signed mobile applications 108 to the web server 104 for distribution. The mobile applications 108 may be digitally signed by the publisher 106 (e.g., using a product such as Mobile2Market from Microsoft) or by a third-party entity authorized to sign the application 108 on the publisher's behalf (such as VeriSign®). The digital signature associated with the mobile application 108 can be used by mobile devices 102 to confirm that the application 108 originated from the mobile application publisher 106 identified in the digital signature and to verify that the application 108 has not be altered or corrupted since it was signed. In other words, the digital signature can provide the mobile device 102 and the mobile device's 102 platform and/or operating system with the requisite level of trust in the mobile application 108 needed to permit its execution.

The signed mobile applications 108 can be made accessible to mobile devices 102 through one or more web pages 112. As shown by arrow 124, the mobile device 102 can send a request (e.g., using a link on a particular web page 112) requesting the download of a mobile application 108 via the mobile device's 102 web browser 146. In response, the web server 104 can send a copy of the requested mobile application 108 to the mobile device 102 (as shown by arrow 128). In addition to the copy of the signed application 108, the web server's 104 response can include a cookie uniquely identifying the mobile device 102. Information linked to the cookie at the web server 104 may be related to the mobile application 108 being downloaded. The web server 104 can use the cookie during later interactions with the mobile device 102 to identify the device, the mobile web browser 146, and/or the downloaded mobile application 140, as well as any settings or additional information associated with the mobile device 102.

In some instances, each cookie may be associated with additional application data 110 stored at the web server 104. The set of additional data for the mobile applications 110 can store data and information generally associated with particular versions of the mobile application 108 (e.g., updates to the applications 108), as well as dynamic data or other information related to specific copies of the application 108 downloaded by one or more mobile devices 102. In some instances, an update may be included in the dynamic data related to a specific copy of the application 108. In other instances, the set of additional data 110 may include a combination of both general and specific data. The set of additional data 110 generally comprises data or information not included in or with the mobile application 108 at the time the application 108 was digitally signed. Thus, if the additional data 110 was added to or used to modify the application 108 by changing or amending the application's code or structure, the digital signature for the application 108 would be invalidated, resulting in some mobile devices 102 (i.e., those requiring valid digital signatures) being unable to execute the mobile application 140. In other instances, an invalid signature may require the mobile device 102 to prompt a user, each time the application 140 is run, for approval before allowing the mobile application 140 access to device-specific resources. For instance, if a mobile application 140 is not associated with a valid signature, the mobile device 140 may require the user to verify that the mobile application 140 is authorized to access the device's memory, network connection, or other components needed or requested by the application 140 at runtime. In those instances, the prompt may be generated once per execution, or during each attempt to access a device component.

As shown by arrow 122, the mobile application publisher 106 can provide the web server 104 with updates and additional data associated with the mobile applications 108. The set of additional data 110 may, at least in part, also contain dynamic information generated by the web server 104 based on one or more factors, including, among others, the actions of the mobile device 102 and its web browser 146 prior to and at the time of requesting the download, information identifying a user associated with the mobile device 102, or information on a copy of the mobile application 108 downloaded by the device 102. For example, the mobile application 108 may be available from more than one web page 112. If the mobile device 102 requests a copy of the application 108 through a first web page 112, the web server 104 may dynamically generate a set of data identifying the first web page 112 as the location from which the application 108 was requested and/or downloaded. Similarly, when the application 108 is downloaded from a second web page, the server 104 can generate a set of data identifying the second web page 112 as the location from which the application 108 was requested and/or downloaded.

For example, the mobile device 102, using the mobile web browser 146, can navigate to a first web page including one or more advertisements. One of the advertisements may be for the mobile application 108, and may include a hyperlink to one of the web pages 112 stored on the web server 104. By activating or clicking on the hyperlink, the mobile web browser 146 can be directed to a second web page 112 where the mobile application 108 can be downloaded. In some instances, one or more of the web pages 112 at server 104 may be landing pages associated with one or more advertisements displayed on web pages internal to and external from the web server 104. Those landing pages may provide the mobile web browser 146 with the ability to download the application 108. In this instance, the set of additional data 110 generated by the web server 104 can define information related to the advertisement and/or the landing page through which the mobile device 102 initiated downloading the application 108. For example, the uniform resource locators (URLs) associated with the link between the advertisement and the landing page can include a parameter describing how the mobile device 102 arrived at the particular web page 112. In other words, the parameter can describe a distribution channel through which the mobile device 102 (via its web browser 146) downloaded the mobile application 108. The distribution channel parameter can be retrieved from the URL associated with the download request, where that parameter is then used by the web server 104 to define a cookie associated with the mobile device 102. If the cookie has not been created, the web server 104 can create and populate the cookie with the parameter information. Information associated with the cookie can be stored at the server 104, and the associated cookie can be sent to the mobile device 102 via the web browser 146 when the copy of the mobile application 108 is downloaded. Cookies received from the web server 104 can be stored in a cookie store 144 at the mobile device 102.

Once the installed and its digital signature verified, the downloaded application 140 can be executed. As shown by arrow 132, the downloaded application 140 can send an HTTP request to the web server 104 (or another server in the same domain). In some instances, the downloaded mobile application 140 may be designed such that during its first execution (or during each execution), an HTTP request is sent to the web server 104 or domain from which the application 140 was downloaded, either to check for updates or other dynamic information, or as part of its normal operations. The request can include the cookie previously set by the web server 104 for the particular domain. The downloaded application 140 and the web browser 146 can share the cookies of the cookie store 144 on the mobile device 102. In one example, for a mobile device 102 running the Windows Mobile operating system, a client application programming interface (API) is provided for accessing and setting cookies in a shared cookie store.

When the HTTP request is received, the web server 104 retrieves the cookie and accesses its set of additional data 110 to retrieve information associated with the cookie. Once the information is retrieved and the HTTP request is processed, the web server 104 sends a response to the downloaded mobile application 140 as shown by arrow 136. The response can include both a communication responsive to the HTTP request and any information associated with the cookie. The mobile device 102 (via the mobile application 140) receives the response and stores the additional information in its additional data store 148. From then on, the mobile application 140 can access the additional data store 148 during its execution to, retrieve, execute, apply, and/or process the additional information as appropriate.

Figure 2:
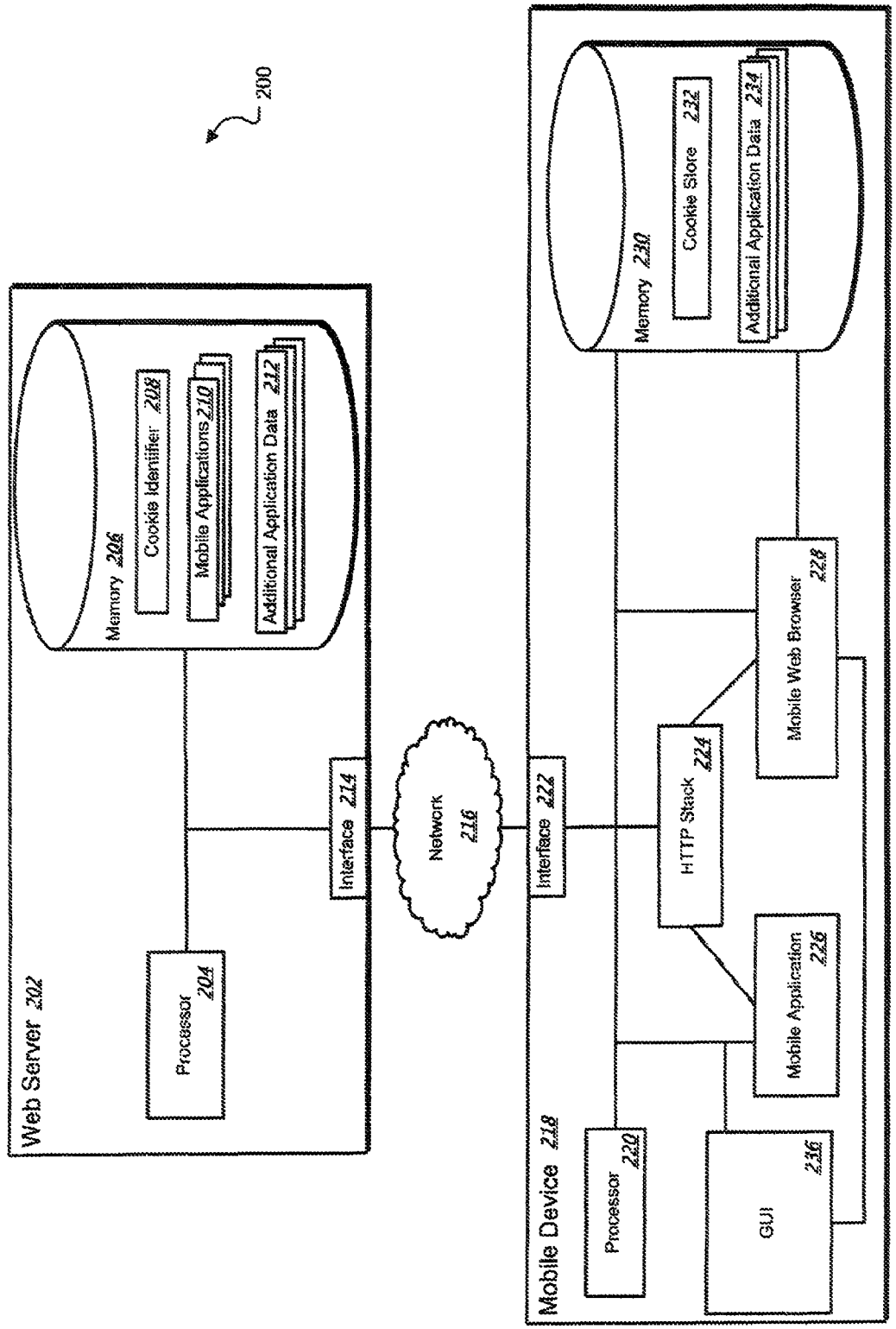
FIG. 2 is a block diagram illustrating an example configuration of a system for adding dynamic application data to digitally signed mobile applications.

FIG. 2 is a block diagram illustrating an example configuration of a system 200 for adding dynamic data to digitally signed mobile applications. As shown, system 200 includes, or is communicably coupled with, a server 202, a mobile device 218, and a network 216. The mobile device 218 is capable of requesting, via the network 216, copies of one or more mobile applications 210 stored at the web server 202. In response to the request, the web server 202 transmits a copy of the requested mobile application(s) 210 to the mobile device 218.

The web server 202 may include a processor 204, a memory 206, and an interface 214. In general, the web server 202 may be an electronic computer device operable to receive, transmit, process, store, or manage data associated with the system 200. The web server 202 of system 200 may be implemented using computers other than servers, as well as a server pool. Further, the server 202 may be adapted or operable to execute any operating system including Linux, UNIX, Windows, Mac OS X, or any other suitable operating system.

The memory 206 associated with the web server 202 may include any memory or database module and may take the form of volatile or non-volatile memory including, without limitation, magnetic media, optical media, random access memory (RAM), read-only memory (ROM), removable media, or any other suitable local or remote memory component. For example, memory 206 may store classes, applications, backup data, business objects, jobs, parameters, cookies, variables, algorithms, instructions, rules, or references thereto.

Illustrated memory 206 includes a cookie identifier and store 208, one or more mobile applications 210, and a set of additional mobile application data 212. Although illustrated within memory 206, some or all of the items may be located outside the memory 206 and/or server 202 in some implementations (e.g., in multiple different memories or multiple different servers). Each mobile application 210 can be any application, program, module, process, or other software that can execute, change, delete, generate, or otherwise manage information on and for a mobile device. Each mobile application 210 may be written or described in any appropriate computer programming language, including, but not limited to, C, C++, and Java, among others, such that the application 210 can run on one or more mobile computing platforms or operating systems including, but not limited to, MICROSOFT® WINDOWS MOBILE®, JAVA® 2 Platform, Micro Edition (J2ME®), MICROSOFT®.NET Compact, SYMBIAN OS, or another appropriate platform or operating system. Further, although described as a mobile application, the application 210 may also comprise software capable of use on non-mobile devices, including laptops, desktops, workstations, servers, or any other appropriate type of computing device. One or more of the mobile applications 210 can comprise a digitally signed mobile application that allows third parties, including the mobile device 218, to identify the application's origin and verify that the application has not been modified since the digital signature was applied. In general, the mobile applications 210 illustrated within the web server 202 are stored for distribution to one or more mobile devices 218 communicably coupled to the server 202.

The set of additional mobile application data 212 represents data associated with one or more of the mobile applications 210, but which has been received or generated after the associated mobile application 210 has been digitally signed. For example, the set of additional mobile application data 212 may include an update to a particular application 210, or information generated in response to or during the download of a particular copy of the application 210. Because certain mobile devices 218 require mobile applications to have a valid digital signature in order to execute, the mobile applications 210 cannot be modified once they have been signed. In other instances, an invalid digital signature may require tedious or time-consuming manual approval of various actions to be performed by the mobile application 210, such as accessing the device's memory or using information or functionality associated with other components. Thus, any update or dynamic application data may be associated with the mobile application 210 on the mobile device 218 rather than by modifying the mobile application 210 itself.

When the mobile application 210 is requested or downloaded, the web server 202 can set and/or create one or more cookies associated with the requesting mobile device 218. The cookies can be sent to the mobile device 218 with the copy of the mobile application 210. Information related to the cookies, such as information identifying the mobile device 218 or the device's user, or information associated with the particular copy of the application 210 downloaded by a plurality of mobile devices 218, is stored in the cookie identifier and store 208 of the web server 202. In one implementation, the cookie identifier and store 208 may comprise a database storing information relating to each of the cookies generated by the web server 202 and provided to the plurality of mobile devices 218. In some instances, the mobile web browser 228, as opposed to the web server 202, can create the cookie based on information received from the web server 202. In those instances, information received from the web server 202 in response to the download request may be used by the web browser 228 (via JavaScript or another appropriate method) to generate the appropriate cookie associated with the web server 202 and the mobile device 218.

After the mobile applications 210 are digitally signed, the publishers of the applications 210 (and other authorized third parties) may provide updates or other application-related information to the web server 202 that are stored with the set of additional application data 212. If updates or other dynamic data has been provided for a particular version of the downloaded mobile application 226, requests to the web server 202 from mobile devices 218 which have downloaded a copy of that application 226 can indicate to the web server 202 that the stored update and/or dynamic information associated with the application 226 should be provided to the mobile device 218. Thus, when the mobile device 218 visits the web server 202 (generally by sending an HTTP request from the browser 228 or the downloaded application 226), the web server 202 can receive the previously-defined cookies. The web server 202 can then search the cookie identifier and store 208 for information linked to or associated with the received cookies. The web server 202 can identify the received cookie as associated with the mobile device 218 (and the downloaded mobile application 226) and determine whether an update or other information associated with the mobile application 226 is available. If the cookie identifier and store 208 indicates that an update or additional information is available, the web server 202 can retrieve the relevant data from the set of additional application data 212 and send it to the mobile device 218.

The web server 202 also includes the processor 204. The processor 204 executes instructions and manipulates data to perform the operations of the web server 202, and may be implemented as, for example, a central processing unit (CPU), a blade, an application specific integrated circuit (ASIC), or a field-programmable gate array (FPGA), among others. Although illustrated as a single processor, multiple processors 204 may be used in some implementations. In FIG. 2, processor 204 executes the operations necessary to receive and process requests from mobile devices 218, access data within the memory 206, send information and data to the mobile devices 218, and perform the other operations associated with the web server 202. The processor 204 may also perform the operations necessary to provide one or more web pages (not illustrated) providing access to or downloads of one or more stored applications 210.

The web server 202 also includes interface 214 for communicating with other computer systems and mobile devices 218 over network 216. Generally, interface 214 comprises logic encoded in software and/or hardware in a suitable combination operable to communicate with the network 216. More specifically, interface 214 may comprise software supporting one or more communication protocols such that the network 216 or hardware is operable to communicate physical signals.

The network 216 facilitates wireless or wireline communication between the web server 202 and any other local or remote computer, including one or more mobile devices 218 in the system 200. Indeed, while illustrated as a single network, network 216 may be a discontinuous network, so long as at least a portion of the network 216 may facilitate communications between senders and recipients. An example wireless link may be provided via 802.11a/b/g, 802.20, WiMax, or other types of wireless links. The network 216 can encompass any internal or external network, networks, sub-network, or combination thereof operable to facilitate communications between various computing components inside and outside the illustrated system 200. The network 216 may communicate, for example, Internet Protocol (IP) packets, Frame Relay frames, Asynchronous Transfer Mode (ATM) cells, voice, video, data, and other suitable information between network addresses. The network 216 may include one or more local area networks (LANs), radio access networks (RANs), metropolitan area networks (MANs), wide area networks (WANs), all or a portion of the Internet, one or more wireless phone networks, and/or any other communication system or systems at one or more locations.

Figure 6:
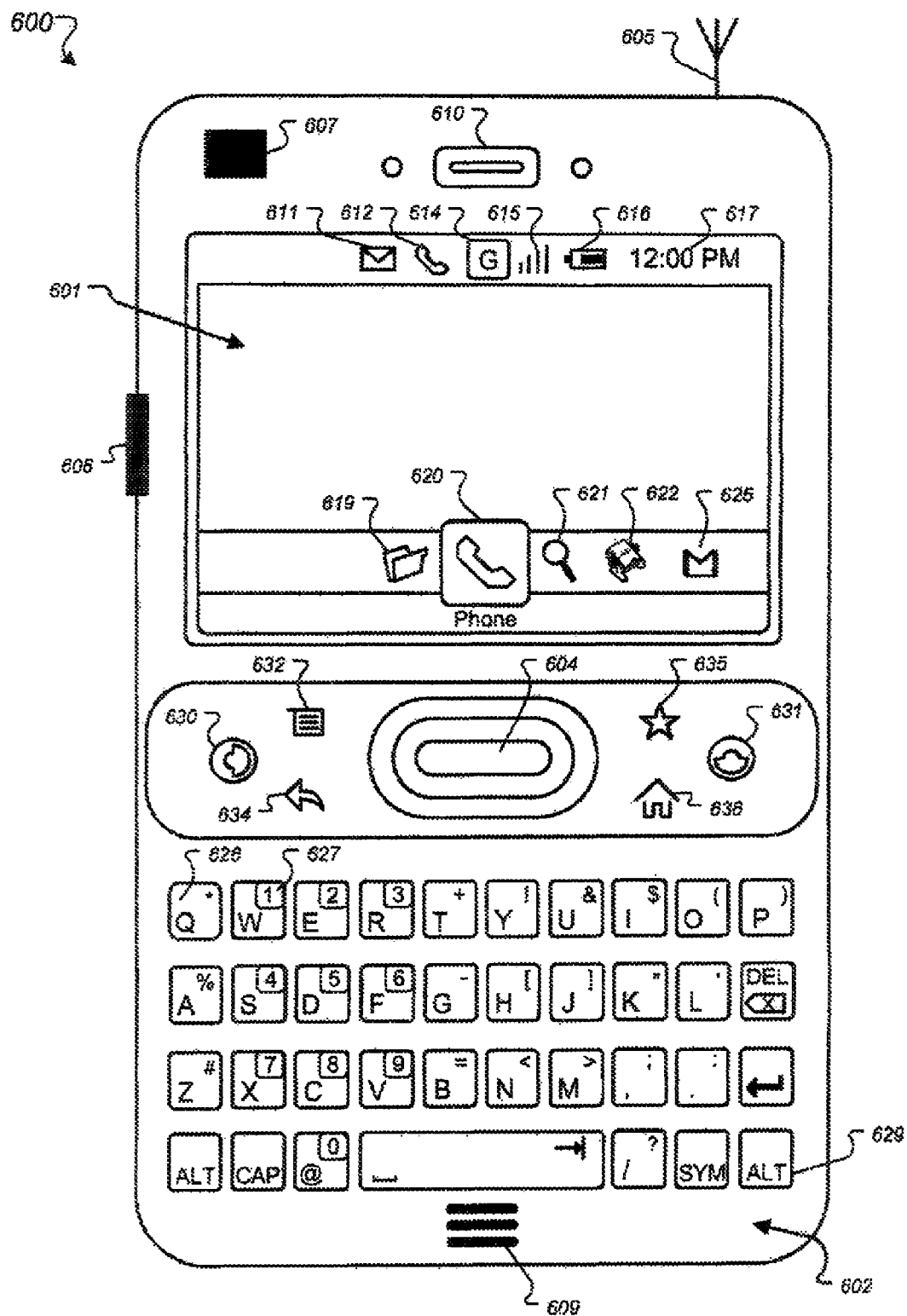
FIG. 6 is a schematic representation of a mobile device that implements embodiments of the features described herein.
Figure 7:
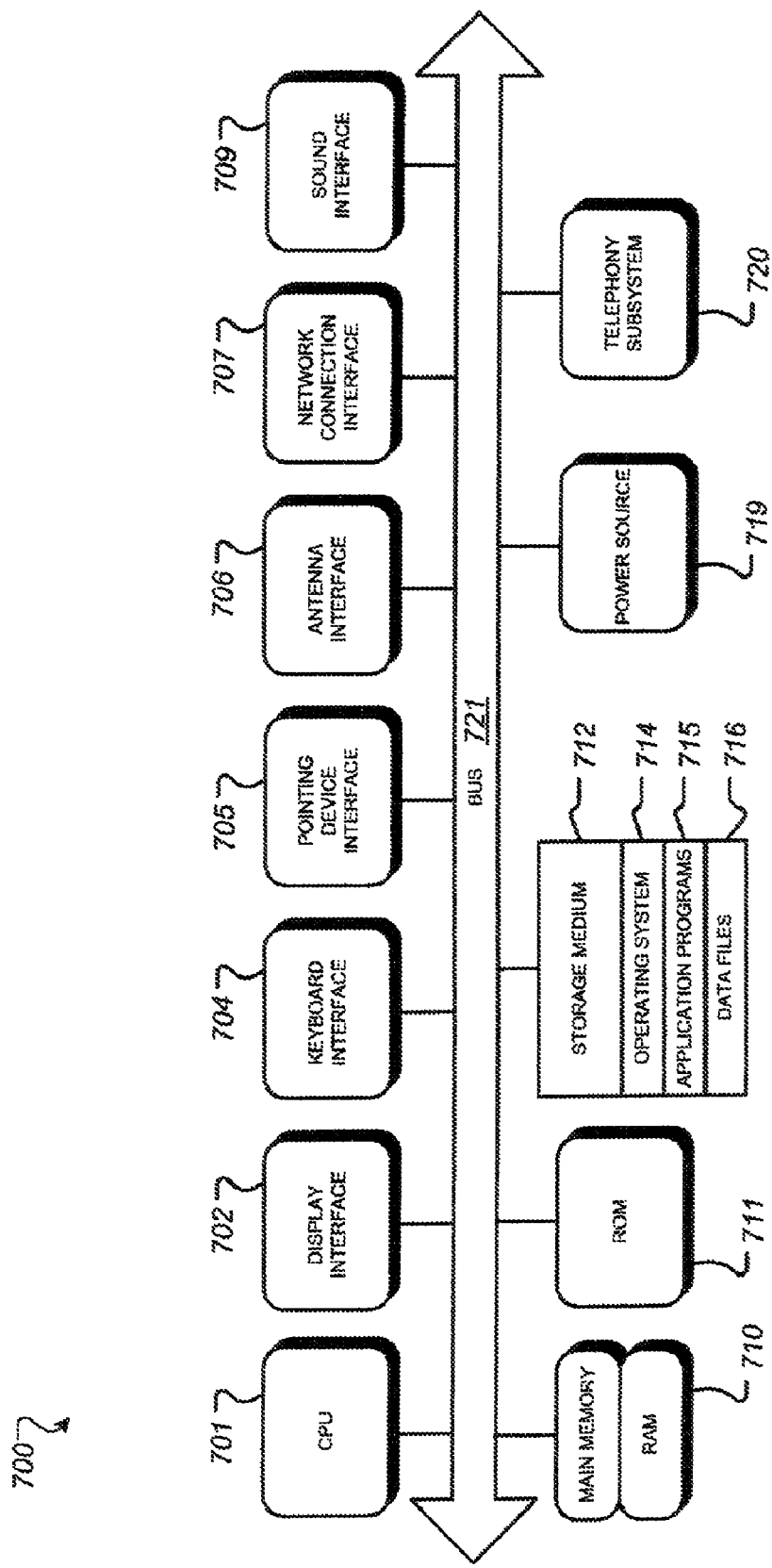
FIG. 7 is a block diagram illustrating the internal architecture of the mobile device of FIG. 6.

The mobile device 218 may be any mobile computer device operable to connect or communicate with web server 202 and/or the network 216 using a wireless or wireline connection. In particular, the mobile device 218 may be embodied as a cell phone, personal digital assistant (PDA), smart phone, wireless messaging device, or other suitable type of mobile computing device. FIGS. 6 and 7, described below, illustrate and describe a particular implementation of a mobile device 218 associated with system 200. There may be any number of mobile devices 218 associated with system 200 at any point in time. At a high level, each mobile device 218 can include a processor 220, a GUI 236, one or more mobile applications 226, a mobile web browser 228, an HTTP stack 224, a memory 230, and an interface 222. In general, the mobile device 218 comprises an electronic computer device operable to receive, transmit, process, and/or store any appropriate data associated with the one or more mobile applications 226 and the mobile web browser 228. In one example, the mobile device 218 may be a cell phone that includes an input device, such as a keypad, touch screen, mouse, trackball, or other device that can accept information, and an output device that conveys information associated with the operation of the mobile device, including digital data, visual information, or the GUI 236. Both the input device and the output device may include fixed or removable storage media, such as a magnetic computer disk, CD-ROM, or other suitable media to both receive input from and provide output to users of the mobile device 218 through the display, namely the GUI 236.

The interface 222 of the mobile device 218 may be similar to the interface 214 of web server 202 in that it may comprise logic encoded in software and/or hardware in a suitable combination and operable to communicate with the network 216. More specifically, interface 222 may comprise software supporting one or more communication protocols such that the network 216 or hardware is operable to communicate physical signals to and from the mobile device 218.

Similarly, the memory 230 of the mobile device 218 may include any memory or database module and may take the form of volatile or non-volatile memory including, without limitation, magnetic media, optical media, random access memory (RAM), read-only memory (ROM), removable media, or any other suitable local or remote memory component. For example, memory 230 may store mobile applications 226, backup data, parameters, cookies, variables, algorithms, instructions, rules, or references thereto. As illustrated, the memory 230 can include a cookie store 232 and a set of additional application data 234.

The GUI 236 is a graphical user interface operable to allow the user of the mobile device 218 to interface with at least a portion of the system 200 for any suitable purpose, including to allow a user of the mobile device 218 to interact with the mobile application 226 and the mobile web browser 228. The term "graphical user interface," or GUI, may be used in the singular or in the plural to describe one or more graphical user interfaces and each of the displays of a particular graphical user interface. Therefore, the GUI 236 can be any graphical user interface, such as a generic web browser, touch screen, or command line interface (CLI) that processes information in the system 200 and efficiently presents the results to a user. Generally, the GUI 236 provides the mobile device 218 with an efficient and user-friendly presentation of data provided by or communicated within the system 200. In particular, the GUI 236 may provide users of the mobile application 226 with access to data stored within the memory 230. The GUI 236 may include a plurality of user interface (UI) elements such as interactive fields, pull-down lists, and buttons operable at the mobile device 218. These UI elements may be related to the functions of the mobile application 226 or the mobile web browser 228. In particular, the GUI 236 may be used in connection with the mobile web browser 228 to view and navigate to various web pages, some of which may be associated with the web server 202 (as illustrated in FIG. 1). Using the web browser 228, the user of the mobile device 218 can request a download of one or more mobile applications 210 from the web server 202.

The mobile application 210 stored at the web server 202 can be downloaded via network 216 and stored at the mobile device 218 (shown as mobile application 226). Further, the mobile application 226 may be a digitally signed copy of a particular mobile application 210 stored at web server 202. Although illustrated external to memory 230, the mobile application 226 may also be stored within memory 230, and accessed and executed accordingly. The mobile application 210 can be any software application that provides additional functionality to the mobile device, such as a web browser, word processor, mapping application, or any other appropriate application. When executed, the mobile application 226 may be able to communicate, via the network 216, with other computers, servers, and systems, such as the web server 202.

The mobile application 226 may be executed by the processor 220. In some instances, processor 220 may be similar to processor 204 of the web server 202. In other instances, the processor 220 may be a processor designed specifically for use in mobile devices such as cell phones or PDAs. Further, although illustrated as a single processor 220, the processor may be implemented as multiple processors in the mobile device 218. Regardless of the type and number, the processor 220 executes instructions and manipulates data to perform the operations of the mobile device 218, including operations necessary to receive and process information from the web server 202, access data within memory 230, execute the mobile application 226 and mobile web browser 228, as well as perform other operations associated with the mobile device 218.

The mobile web browser 228 is a software application which enables a user to display and interact with text, images, videos, music and other information typically located on web pages associated with one or more web servers (i.e., web server 202), or other computers accessible via the network 216. Text and images on various web pages can contain hyperlinks to other web pages, with some of those web pages associated with different web servers and domains. Users of the mobile device 218 can quickly and easily access information provided on various web pages by navigating those links using the mobile web browser 228. In general, web browsers format hypertext markup language (HTML) information for display, so the appearance of a web page may differ between browsers, based on the particular browser used and the particular settings defined by or for the user. In FIG. 2, the web browser 228 can connect to the web server 202 via the network 216. The mobile web browser 228 may be a web browser designed for use with mobile devices 218, and specifically with mobile operating systems, such as Windows Mobile or Symbian OS. Further, the mobile web browser 228 may provide different or alternative functionality as compared to web browsers used in standard, or non-mobile operating systems. Examples of acceptable mobile web browsers include Internet Explorer Mobile by Microsoft, Blackberry Browser by Research in Motion, Opera Mobile by Opera Software ASA, or Safari by Apple Inc. Other appropriate mobile browsers may also be used.

Within the mobile device 218, the mobile web browser 228 interfaces with an HTTP stack 224. The HTTP stack 224 is a software component of the mobile device 218 which provides for sending requests to and receiving responses from one or more locations associated with network 216. For instance, the HTTP stack 224 can be used to establish a connection with the web server 202 and to transmit HTML and other data to and from the mobile web browser 228. To do so, the HTTP stack 224 can use the interface 222 of the mobile device 218 to communicate with the web server 202. Upon receiving an HTTP request from the mobile web browser 228 (or the mobile application 226) to a particular domain, the HTTP stack 224 can retrieve one or more cookies associated with the domain from a cookie store 232, including those cookies previously received from the web server 202. The HTTP stack 224 may be shared by the mobile application 226, allowing the application 226 to access the HTTP stack's 224 functionality when communicating with the web server 202 (or any other server or computer) via the network 216. Thus, the HTTP stack 224 can be used by both the mobile application 226 and the mobile web browser 228, allowing the application 226 and browser 228 to have shared access to the cookie store 232. In other implementations, the mobile application 226 and the web browser 228 can access, retrieve, and use cookies from the cookie store 232 without using the HTTP stack 224.

The cookies of the cookie store 232 may be received during the mobile web browser's 228 interactions with other systems (e.g., the web server 202). For instance, when the mobile web browser 228 is used to request the download of the mobile application 226 (mobile application 210 when stored at the web server 202), the web server 202 may send one or more cookies along with the application 210. Those cookies may then be stored in the cookie store 232 by the HTTP stack 224 or the mobile web browser 228. In future requests to the web server 202 sent by either the mobile application 226 or the mobile web browser 228, the HTTP stack 224 can retrieve and include the stored cookies in the requests. By doing so, the web server 202 can authenticate, track, or maintain specific information about the mobile device 218, the mobile application 226, and/or the mobile web browser 228. The system 200 may include a plurality of web servers and computers associated with network 216 and accessible by the web browser 228 and the mobile application 226. Cookies received from the other servers and computers can also be stored within the cookie store 232. Future requests to those servers and computers will include the appropriate cookies as retrieved by the HTTP stack 224.

In the present implementation, when a cookie is sent to the web server 202 with a request from the mobile application 226, the mobile device 218 may receive, in addition to a normal response, a set of additional information associated with the cookie and the downloaded application 226. That information may include any data from the web server's set of additional application data 212 associated with the cookie sent by the mobile application 226. Once received at the mobile device 218, the HTTP stack 224, the mobile application 226, and/or the mobile web browser 228 can store the received information as or with the mobile device's set of additional application data 234. In some instances, the additional application data 234 can be stored such that when the mobile application 226 is executed, the application 226 can access the memory 230 to retrieve and integrate the additional data 234 at runtime. Because particular implementations require each application 226 to have a valid digital signature (e.g., to allow any execution of the mobile application 226, to avoid user prompts requesting manual approval for the application's actions, etc.), the applications 226 cannot (or should not) be updated or modified by changing the code of the software. Instead, during execution the application 226 may access the additional application data 234, and use the relevant updates or dynamic data to perform new or updated processes, or to process the new information during the application's 226 normal activities. In some instances, the mobile application 226 may be designed to search for the additional dynamic information at a particular location in the mobile device's 218 memory 230 (e.g., the set of additional application data 234) each during execution. In other instances, the additional application data 234 may not be actively used by the mobile application 226 in its normal execution. Instead, the additional application data 234 may be associated with later requests from one or more external systems or applications. For instance, the additional application data 234 associated with a particular mobile application 226 may be related to a particular distribution channel used by the mobile device 218 (via the mobile web browser 228) to identify, locate, and download the application 226. The external system requesting the information may be a tracking or marketing application attempting to determine the effectiveness of marketing initiatives and web-based advertising for the particular application 226 by analyzing the application's distribution channels. Those external systems may request from a plurality of mobile devices 218 information defining the particular distribution channels associated with the downloaded applications 226. In those instances, either the mobile web browser 228 or the mobile application 226 may access the set of additional application data 234, retrieve the relevant stored information, and respond to the external system's request with the information defining the distribution channel used. The aggregated set of data retrieved from the plurality of mobile devices 218 can be used to calculate various metrics and study the effectiveness of marketing and advertising strategies used to distribute different applications. For instance, the aggregated set of data can provide information defining one or more of the following: the number of distinct users accessing a distribution channel, the number of distinct users downloading a particular application, the number of distinct users successfully installing the download application, the number of distinct users running the downloaded application a first time, and the number of distinct users running the product multiple times.

Figure 3:
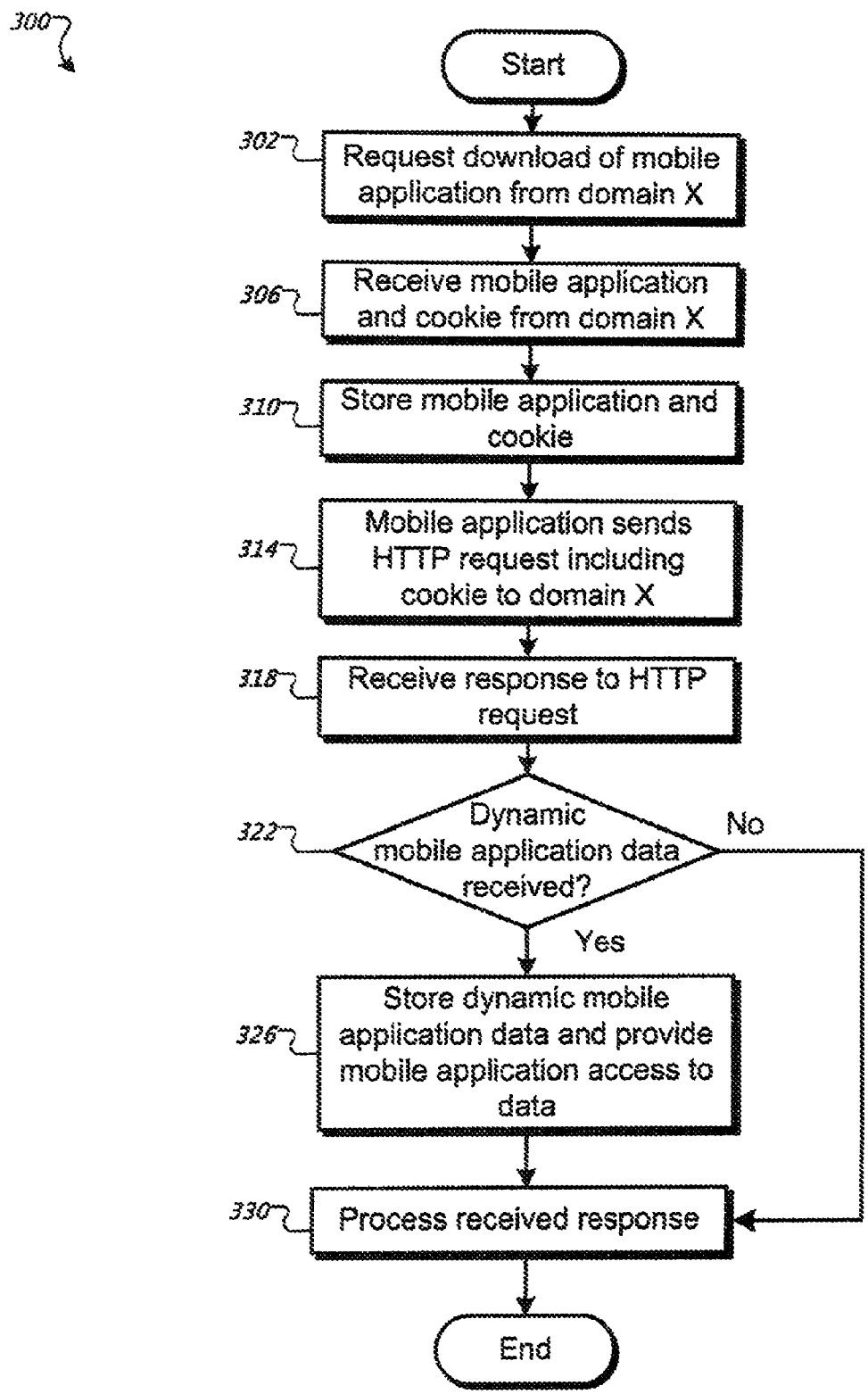
FIG. 3 is a flow diagram of a method for adding dynamic application data to a digitally signed mobile application on a mobile device.

FIG. 3 is a flow chart of a method for adding dynamic application data to a digitally signed mobile application on a mobile device. The method 300 may be performed, for example, by a system such as systems 100 and 200, but for clarity of presentation, the description that follows uses the system 200 as the basis of an example for describing the methods. However, another system, or combination of systems, may also be used to perform the method 300.

At 302, a mobile device sends a request to download a mobile application from a particular domain (hereinafter, "domain X"). In some implementations, the mobile device may send the request using a mobile web browser. The mobile device may have navigated through a series of web pages via one or more hyperlinks to arrive at a particular web page where the download request can be made or where the download occurs. For example, the mobile web browser may navigate to a website associated with the mobile application's publisher. By following a link on the homepage of the publisher, the web browser may navigate to a page listing one or more applications available to download. The mobile web browser can activate a hyperlink associated with a particular listing for a desired application, which navigates the browser to the download page of the selected application. Alternatively, a first web page may include an advertisement for a particular application. A hyperlink associated with the advertisement can be activated such that the mobile web browser is taken to a second web page in domain X associated with the advertisement where the application can be downloaded. Domain X may be associated with a single web server storing a copy of the requested mobile application, or it may be associated with a plurality of web servers hosting a set of related web pages, where one or more of the web servers store copies of mobile applications available for downloading. In some instances, a first web server can store and provide the web pages for the domain, while a second web server can store and provide copies of the mobile applications. In those instances, a download request made through a web page associated with a first web server can cause the mobile application to be downloaded from web page associated with a second web server. In some implementations, the HTTP request sent from one web page to another may include a uniform resource locator (URL) associated with the download request. The download request can include a parameter defining how the mobile web browser arrived at the download request page, such as by defining the previous page or pages visited by the web browser. In other words, the parameter can define a particular distribution channel used by the mobile web browser prior to requesting the download. In some instances, the distribution channel parameter can be appended to the HTTP request and used to identify the download request URL.

At 306, the mobile device receives a copy of the mobile application along with a web browser cookie from domain X. The copy of the mobile application can be a digitally signed, where the digital signature can be used to identify the origin of the application and verify that the application's code has not been modified since signing. The web browser cookie can be a cookie generated by a web server in domain X communicating with the mobile web browser, wherein the cookie is to be used to authenticate the mobile device, to track the mobile device's interactions with domain X (e.g., for state maintenance, session tracking, etc.), or to maintain information about the mobile device and/or the particular downloaded copy of the mobile application.

At 310, the mobile device stores the downloaded mobile application and the web browser cookie. In some implementations, the mobile application may be installed automatically once the mobile device receives the software, while in others the application may not be installed until prompted by a user or the device's operating system. Additionally, the web browser cookie may be stored by the mobile web browser in a central location (e.g., the cookie store 232 in FIG. 2) to allow for easy retrieval and access to the cookie by the mobile web browser and the mobile application.

At 314, the mobile application is executed. When executed, the mobile application can make an HTTP request to a web server at domain X. The HTTP request can be any request by the mobile application to a web server at domain X. For instance, the HTTP request may be associated with the general purpose of the mobile application. In one example, the mobile application may be a news aggregator designed to retrieve information from the Internet, and specifically from a web page in domain X. Thus, when the application is executed, an HTTP request is automatically sent to domain X. In other instances, the HTTP request may be specifically made to check for updates or additional information associated with the mobile application. In those instances, when executed the mobile application sends an HTTP request to the particular domain from which it was downloaded. In either instance, the HTTP request sent by the mobile application can include one or more cookies received during previous interactions with the web server(s) of domain X. The cookies may be those previously stored by the web browser at 310. In some implementations, the cookies stored by the web browser are also accessible for use by the mobile application. The web server the mobile application sends the HTTP request to can be the same web server from which the mobile application was downloaded, or, in other instances, may be different from the web server the application was downloaded from, but still in the same domain.

At 318, the mobile device receives a response to the mobile application's HTTP request. The response can contain HTML, data, or other information relevant to the request. In some instances, the response can include data and information associated with or provided in response to the cookies included in the request. The data and information can include dynamic information associated with the mobile application, such as an update. In other instances, the information received may include data defining a particular distribution channel used by the mobile web browser to download the mobile application. In some instances, no additional information (other than that responsive to the HTTP request) may be included in the response.

At 322, the mobile device determines whether, in fact, any dynamic mobile application data was included with the response If it is determined that no dynamic mobile application data is received, method 300 can skip to 330 where the response is processed by the mobile application. However, if the mobile device determines that some dynamic mobile application data is received with the response to the request, method 300 can continue at 326.

At 326, the mobile device stores the received dynamic mobile application data. The mobile device can receive the combined response to the mobile application's HTTP request at 318 and parse the response into the response to the HTTP request and the set of dynamic mobile application data associated with the one or more cookies sent with the HTTP request. The dynamic mobile application data can be stored, for instance, with the set of additional application data 234 illustrated in FIG. 2. Because the mobile application is digitally signed, and because the operating system and/or platform of the mobile device may require that applications have a valid digital signature to execute, the dynamic mobile application data is not used to directly modify the code of the mobile application. Instead, the dynamic mobile application data is stored locally on the mobile device, where the mobile application can quickly and efficiently access the data for further use. In some instances, the mobile application may be designed such that during each execution the application searches a particular location within the mobile device for any dynamic data or updates. If data is located, the application can integrate the data at runtime.

At 330, the mobile application processes the response to the HTTP request. For example, where the mobile application is a news aggregator, the mobile application can interpret the information (e.g., stories and articles) received at 318 and organize that information for presentation to the user. After 330, the method 300 can end.

In some implementations, once the dynamic mobile application data is received and stored locally on the mobile device, the mobile application may send an acknowledgment receipt to domain X. The acknowledgement receipt can be used to indicate that the mobile device 218 has received the dynamic mobile application data and stored or persisted it locally in the set of additional application data 234. In response to the acknowledgement receipt, the web server 202 may send an updated cookie to the mobile device 218. For instance, if no additional dynamic mobile application data is available from the web server, the web server may update the cookie by adding an expired expiration date to the cookie's parameters, such that the cookie expires or is removed from the mobile device. In other instances, the web server may include a timestamp with each newly created or generated cookie, wherein cookies with more recent timestamps are used instead of cookies with older timestamps. In other instances, the web server 202 may send a request to the mobile device to delete or remove the cookie. In still other instances, the updated cookie may remove only the information from the cookie associated with the downloaded mobile application 226 so that future interaction with the web server 202 does not involve duplicative exchanges of identical dynamic mobile application data. In some instances, the updated cookie may include or reference information identifying the latest data received by the mobile device 218 so that future updates and/or previously unavailable or unsent dynamic data will still be provided to the mobile device 218. In other instances, the cookie may remain unchanged on the mobile device 218, with the web server 202 locally updating any relevant information associated with the cookie.

Figure 4:
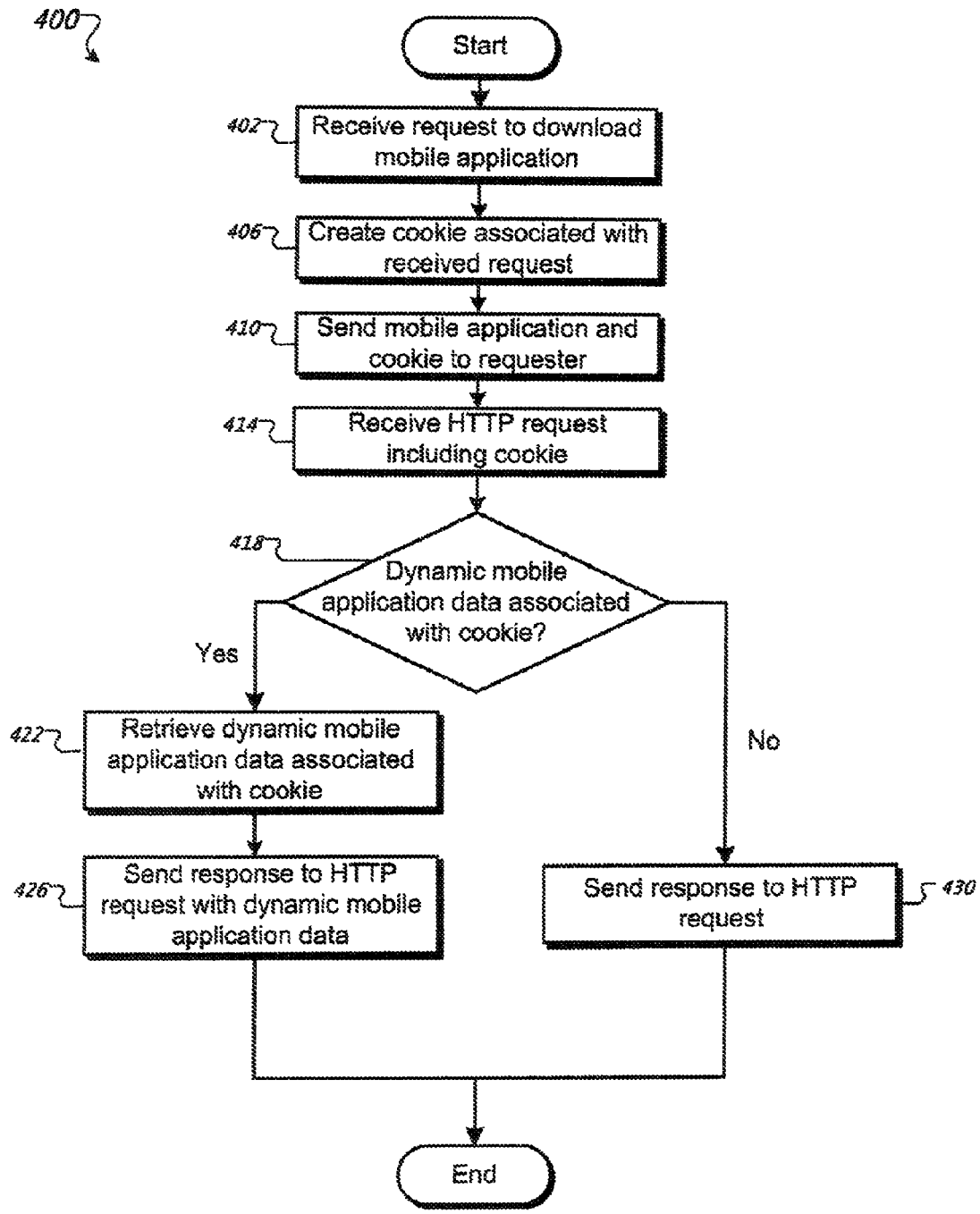
FIG. 4 is a flow diagram of a method for providing dynamic application data to be added to a digitally signed mobile application stored on a mobile device.

FIG. 4 is a flow diagram of a method for providing dynamic application data from a web server to be added to a digitally signed mobile application stored on a mobile device. The method 400 may be performed, for example, by a system such as the systems 100 and 200, but for clarity of presentation, the description that follows uses the system 200 as the basis of an example for describing the methods. However, another system, or combination of systems, may be used to perform the method 400.

At 402, a web server receives a request to download a mobile application. In some implementations, the request is an HTTP request received from a mobile web browser 228 associated with the mobile device 218 via a web page associated with the web server 202, where the HTTP request includes or represents a request to download a mobile application 210. In some implementations, the HTTP request may include information identifying the requesting mobile device, such as an IP address, a download request URL from where the mobile web browser 228 requested the mobile application 210, or other appropriate information. For instance, the download request URL may include a parameter defining the distribution channel used by the mobile web browser 228 to arrive at the download request page. The distribution channel parameter may be appended to the download request URL sent to the web server 202.

At 406, the web server can set or create a cookie associated with the received request. In some instances, the cookie can be used to identify the mobile device 218 requesting the application. In other instances, the cookie can be used to identify the version of the mobile application 210 requested by the mobile device 218. In still other instances, the cookie can be used to identify the distribution channel the mobile web browser 228 used to download the mobile application 210. The distribution channel may define the URL from which the request was sent, information describing a particular marketing initiative followed by the browser 228 to request the download, or a series of navigations the mobile web browser 228 followed prior to requesting the application 210.

The web server 202 can store the information identifying and related to the cookie in a cookie identifier and store 208. When a cookie is later received in a request to the web server 202, any information or data associated with the cookie can be located by referencing the information stored in the cookie identifier and store 208. The cookie identifier and store's 208 information can be used to direct the web server 202 to relevant updates or dynamic mobile application data stored in the set of additional application data 212.

At 410, the web server responds to the download request by sending a copy of the mobile application and the cookie to the requester. The cookie can be included in an HTTP response, allowing it to be set on the mobile device 218. In some instances, more than one cookie can be included in the HTTP response. In one instance, an HTTP response is sent from the web server 202 to the requesting mobile web browser 228, indicating that the appropriate cookies should be set with a particular set of values to uniquely identifying the mobile web browser 228, the mobile application 226, and/or the mobile device 218. Thus, any later HTTP requests including those cookies can allow the web server 202 to identify the mobile device 218 as the source of the request.

At 414, the web server (or a second web server internal or external to the same domain) receives a new HTTP request. In some instances, the request is sent by the downloaded mobile application 226 stored on the mobile device 218. The HTTP request can include any cookies previously set by the web server 202 (or any server in the same domain). The cookies received in the HTTP request can be used to identify the mobile device 218 as the source of the HTTP request, the copy of the mobile application 226 previously downloaded by the device 218, or to provide any other relevant information associated with the cookie.

At 418, the web server determines whether any dynamic mobile application data associated with the received cookie is available. In some instances, the determination is performed by comparing the received cookie with information stored in the cookie identifier and store 208. The cookie identifier and store 208 defines the set cookies and may indicate whether any associated dynamic data is available for the mobile application 226 in the set of additional application data 212. Determining whether data is available for the mobile application 226 may entail determining whether the version of the mobile application 210 associated with the cookie is associated with an update or any new dynamic information. In some instances, the application's publisher may have distributed an update to the application 210, with a copy of the update stored with the set of additional application data 212 at the web server 202. In other instances, dynamic information associated with the cookie, including, for example, the distribution channel for the particular copy of the mobile application 226, can also be stored with the set of additional application data 212. Each cookie entry in the cookie identifier and store 208 may include information or a link directing the web server 202 to the relevant data or information in the set of application data 212.

If the web server determines that no dynamic mobile application data is associated with the received cookie, then method 400 moves to 430, where the HTTP request is processed and an appropriate response is sent to the requester. However, if the web server determines that some dynamic mobile application data is associated with the cookie, then method 400 continues at 422.

At 422, the web server retrieves any, all, or a portion of the dynamic mobile application data associated with the cookie. In one implementation, the web server 202 can use information in the cookie identifier and store 208 to determine where the appropriate data is located. For instance, if the information associated with the cookie indicates that an update to the downloaded mobile application 226 is available, then the appropriate update can be retrieved from the set of additional application data 212. In other instances, the set of additional application data 212 or the information in the cookie identifier and store 208 may identify location external to the web server 202 where the relevant update or information is located. In those instances, the web server 202 can retrieve the update from the external location via the network 216. In other implementations, the dynamic mobile application data associated with the cookie and stored in the set of additional application data 212 may represent information generated by the web server 202 in response to the download request from the mobile application at 406.

Once the dynamic mobile application data has been retrieved, at 426 the web server sends a response to the HTTP request. The response can include information relevant and responsive to the received HTTP request, along with the retrieved dynamic mobile application data associated with the one or more cookies received with the HTTP request. After 426 and 430, method 400 ends.

In some implementations, the web server may receive a receipt acknowledgement indicating that the recipient received and stored the dynamic mobile application data sent at 426. In response, the web server 202 may remove references to the provided dynamic mobile application data within the cookie identifier and store 208 for the cookie(s) associated with the mobile device 218. Thus, if another HTTP request is received from the mobile device 218 with device-specific cookies, the web server 202 will not re-transmit the previously-provided dynamic mobile application data. Further, if the cookie associated with the mobile device 218 is blank or empty, the web server 202 may expire or otherwise remove the cookie. The cookie may be expired by sending an updated cookie with a expiration date that has passed to the mobile device 218, or by otherwise indicating that the cookie should be removed or deleted. If, however, the cookie retains some relevant information, only the portions related to the provided dynamic mobile application data may be removed. In those instances, the web server 202 can respond to the mobile device 218 with an updated cookie to overwrite or replace the previous cookie. In some instances, the cookie stored at the mobile device 218 can remain unchanged, while only the cookie-related information stored at the web server 202 (e.g., the information in the cookie identifier and store 208) is updated. Further interaction with the mobile device 218 will then not result in the same dynamic data and updates being sent in future exchanges. Instead, only new updates and unsent dynamic data associated with the mobile application 226 will be provided.

Figure 5:
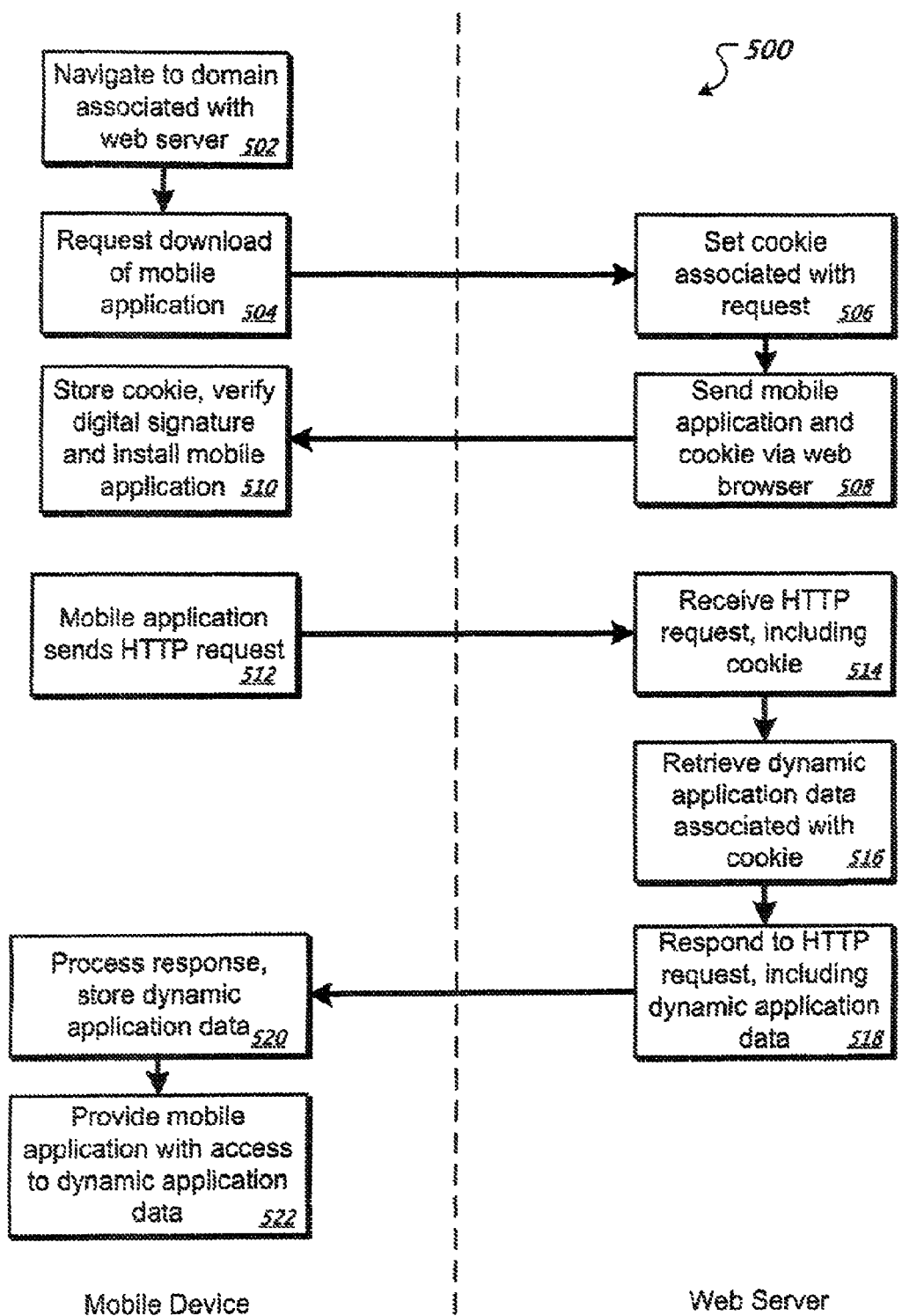
FIG. 5 is an example signaling and flow diagram illustrating operations for requesting, providing, adding, and accessing dynamic application data to a digitally signed mobile application in an example system.

FIG. 5 is a signaling and flow diagram illustrating a process 500 providing operations in a system for downloading a digitally signed mobile application to a mobile device, and then, without invalidating the mobile application's digital signature, adding and accessing dynamic application data associated with the application. In general, the depicted process describes operations between a mobile device associated with a mobile web browser and a downloaded application, and a web server storing and distributing copies of the mobile application, as well as updates and other dynamic data associated with the downloaded application. The process 500 may be performed, for example, by a system such as the systems 100 and 200, but for clarity of presentation, the description that follows uses the system 200 as the basis of an example for describing the methods. However, another system, or combination of systems, may be used to perform the process 500.

At box 502, a mobile web browser in use on the mobile device is navigated to a domain associated with the web server. In some implementations, the mobile web browser can be directed to a particular domain through an advertisement for a particular mobile application. For instance, the mobile web browser may be viewing a first web page that includes an advertisement for a mobile application. By activating a hyperlink associated with the advertisement, the mobile web browser can be directed to a second web page where the mobile application can be downloaded.

At box 504, the mobile web browser of the mobile device can send a request to download the mobile application from the web server. In some instances, the request can be initiated by activating a UI element (e.g., a button, a drop-down box, a hyperlink, etc.) included within a particular web page. In other instances, the download may be requested automatically upon navigating to or arriving at the web page. The request may be transmitted to the web server as an HTTP request.

The web server receives the request to download the mobile application and sets (and/or creates) a cookie associated with the request at box 506. The cookie can be used to identify the mobile device during future interactions between the device and the web server (or another web server within the same domain). In some implementations, the cookie may specify a distribution channel by which the mobile web browser navigated to request the download. The distribution channel can be determined by parsing information included in the request sent by the mobile device. For instance, the download request web page URL may include a distribution channel parameter identifying the previous web page or series of web pages visited by the browser prior to reaching the download request URL. The distribution channel parameter can be taken from the URL and included in the new cookie. The cookie can also identify the particular version of the mobile application requested by the mobile device. If a later received cookie is associated with a version of the mobile application for which an update is available, the web server can send the appropriate updates to the mobile device. In still other instances, the cookie can include information uniquely or specifically identifying a particular mobile device. In particular instances, some, but not all, mobile devices may be identified by similar information (e.g., a model number, a service provider, etc.). The cookie may include some information shared by cookies associated with other mobile devices. Additionally, the cookie may include some information shared by other devices, as well as some information (or a particular combination of shared information) that uniquely or specifically identifies the mobile device, the mobile application, the mobile web browser, or a user thereof.

At box 508, the web server sends the requested mobile application and the cookie (set at 506) to the mobile device. The cookie can be sent via an HTTP response directed to the mobile web browser associated with the mobile device. The mobile application can be downloaded using the functionality of the mobile web browser.

At box 510, the mobile device, upon receiving the web server's response, can store the cookie in the appropriate location, and, if the mobile application's digital signature is verified, install the mobile application on the mobile device. In some implementations, the cookie can be stored on the mobile device 218 in a cookie store 232 shared by the mobile web browser 228 and the downloaded mobile application 226. In one implementation, the mobile application's digital signature can be generated with a public and private key pair. A mobile application publisher, or another entity used to sign the application, can be associated with a public and private key pair. Using an agreed-upon or publicly known cryptographic digest or hash function, the contents or code of the application can be processed by the publisher or signing entity using the hash function to generate a first hash value. That value can then be encrypted with the publisher's (or signing entity's) private key, and the encrypted first hash value can be included with or embedded in the mobile application. The mobile device, upon receiving the signed mobile application, can use the same hash function as the publisher or signing entity to generate a second hash value for the mobile application. The public key associated with the publisher or signing entity can then be used by the mobile device to decrypt the first hash value included with the mobile application. If the decrypted first hash value and the generated second hash value are identical, the digital signature is considered valid and the mobile application is deemed verified. In alternative implementations, any appropriate digital signature technique can be used. In some instances, the mobile application may be installed on the mobile device before its digital signature is validated. In those instances, the digital signature may be verified prior to the application's first execution.

At box 512, the digitally signed and verified mobile application is executed. During execution, the mobile application sends an HTTP request to the web server that includes the previously-set cookie(s) stored at the mobile device. The HTTP request can be a part of the mobile application's normal operations, or the request can be sent specifically to check for updates or dynamic data.

At box 514, the web server receives the HTTP request from the mobile application, along with one or more cookies. Using the cookies, the web server can identify the mobile device, as well as the particular mobile application downloaded at box 510. To do so, the web server 202 can compare the received cookie with a list of previously-generated cookies associated with the domain of the web server (as stored in the cookie identifier and store 208). After locating the cookie, the web server 202 can retrieve detailed information identifying the mobile device, the mobile application (including the particular version of the mobile application downloaded by the mobile device), the distribution channel used by the mobile web browser that led to the download of the mobile application, and any other status and state information associated with previous interactions between the web server and the mobile device.

At box 516, the web server retrieves any dynamic data associated with the cookie. For example, retrieving the dynamic data may include retrieving a software update or other dynamic information (i.e., the distribution channel associated with the application's download) stored at the web server 202 (i.e., from the set of additional application data 212) that is associated with the particular version of the downloaded mobile application. In another example, the software update or dynamic information may be retrieved from a location remote from the web server 202 identified by the cookie identifier and store 208 or by the set of additional application data 212 (e.g., an update server controlled by the publisher of the mobile application).

At box 518, the web server transmits a response to the mobile application's HTTP request. The response includes any dynamic application data identified and retrieved at box 516. In some instances, dynamic application data may be sent in a separate communication from the response to the mobile application's HTTP request. In other instances, the dynamic application data may be embedded within or included with the response.

At box 520, the mobile application receives and processes the response from the web server. In some instances, the response to the HTTP request may be processed separately from any received dynamic mobile application data. The response to the HTTP request can be processed normally by the mobile application or the mobile device. The dynamic application data received at 520 is stored or persisted at the mobile device for future use and/or integration with the mobile application. In some instances, the dynamic application data can be stored in a predefined location, such as a particular folder or other location within the mobile device 218 (e.g., the set of additional application data 234).

Finally, at box 522, the mobile application can be provided access to the dynamic application data. In some implementations, the mobile application can be designed such that when executed, the application can search a predefined location within the mobile device for its associated stored updates and other dynamic information. In other implementations, the storage location for the dynamic application data can be provided to the mobile application using one or more runtime parameters accessed by the mobile application during execution. For example, when the additional information is needed during execution, the mobile application can access those defined parameters to determine the proper location for any dynamic data associated with the application. In some instances, the mobile application may attempt to access the stored dynamic data each time the application is executed. In other instances, the dynamic data may only be accessed by the mobile application in response to a request from another application or web server. In those instances, the mobile application can access the information when requested, but otherwise ignore the stored data during normal execution.

Referring now to FIG. 6, the exterior appearance of a device 600 that implements the systems and processes defined herein is illustrated. Briefly, and among other things, the device 600 includes a processor configured to request, download, and add dynamic information to a digitally signed mobile application without invalidating the application's digital signature.

In more detail, the hardware environment of the device 600 includes a display 601 for displaying text, images, and video to a user; a keyboard 602 for entering text data and user commands into the device 600; a pointing device 604 for pointing, selecting, and adjusting objects displayed on the display 601; an antenna 605; a network connection 606; a camera 607; a microphone 609; and a speaker 610. Although the device 600 shows an external antenna, the device 600 can include an internal antenna, which is not visible to the user.

The display 601 can display video, graphics, images, and text that make up the user interface (or GUI 236) for the software applications used by the device 600, and the operating system programs used to operate the device 600. Among the possible elements that may be displayed on the display 601 are a new mail indicator 611 that alerts a user to the presence of a new message; an active call indicator 612 that indicates that a telephone call is being received, placed, or is occurring; a data standard indicator 614 that indicates the data standard currently being used by the device 600 to transmit and receive data; a signal strength indicator 615 that indicates a measurement of the strength of a signal received by via the antenna 605, such as by using signal strength bars; a battery life indicator 616 that indicates a measurement of the remaining battery life; or a clock 617 that outputs the current time.

The display 601 may also show application icons representing various applications available to the user, such as a web browser application icon 619, a phone application icon 620, a search application icon 621, a contacts application icon 622, an email application icon 625, or other application icons.

A user uses the keyboard (or "keypad") 602 to enter commands and data to operate and control the operating system and applications. The keyboard 602 includes standard keyboard buttons or keys associated with alphanumeric characters, such as keys 626 and 627 that are associated with the alphanumeric characters "Q" and "W" when selected alone, or are associated with the characters "*" and "1" when pressed in combination with key 629. A single key may also be associated with special characters or functions, including unlabeled functions, based upon the state of the operating system or applications invoked by the operating system. For example, when an application calls for the input of a numeric character, a selection of the key 627 alone may cause a "1" to be input.

In addition to keys traditionally associated with an alphanumeric keypad, the keyboard 602 also includes other special function keys, such as an establish call key 630 that causes a received call to be answered or a new call to be originated; a terminate call key 631 that causes the termination of an active call; a drop down menu key 632 that causes a menu to appear within the display 601; a backwards navigation key 634 that causes a previously accessed network address to be accessed again; a favorites key 635 that causes an active web page to be placed in a bookmarks folder of favorite sites, or causes a bookmarks folder to appear; a home page key 636 that causes an application invoked on the device 600 to navigate to a predetermined network address; or other keys that provide for multiple-way navigation, application selection, and power and volume control.

The user uses the pointing device 604 to select and adjust graphics and text objects displayed on the display 601 as part of the interaction with and control of the device 600 and the applications invoked on the device 600. The pointing device 604 is any appropriate type of pointing device, and may be a joystick, a trackball, a touch-pad, a camera, a voice input device, a touch screen device implemented in combination with the display 601, or any other input device.

The antenna 605, which can be an external antenna or an internal antenna, is a directional or omni-directional antenna used for the transmission and reception of radio frequency (RF) signals that implement point-to-point radio communication, wireless local area network (LAN) communication, or location determination. The antenna 605 may facilitate point-to-point radio communication using the Specialized Mobile Radio (SMR), cellular, or Personal Communication Service (PCS) frequency bands, and may implement the transmission of data using any number or data standards. For example, the antenna 605 may allow data to be transmitted between the device 600 and a base station using technologies such as Wireless Broadband (WiBro), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Evolution-Data Optimized (or Evolution-Data Only)

(EVDO), Time Division-Code Division Multiple Access (TD-CDMA), Universal Mobile Telecommunications System (UMTS), Wideband Code Division Multiple Access (W-CDMA), Enhanced Data rates for GSM Evolution (EDGE), Enhanced GPRS (EGPRS), General Packet Radio Service (GPRS), Global System for Mobile communications (GSM), DMobile Telephone System (MTS), Push-To-Talk (PTT), or other technologies. Communication via W-CDMA, HSUPA, GSM, GPRS, and EDGE networks may occur, for example, using a QUALCOMM chipset with an QUALCOMM transceiver and power management circuit.

The wireless or wireline computer network connection 606 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 606 may connect to a LAN network, a corporate or government WAN network, the Internet, a telephone network, or other network. The network connection 606 uses a wireline or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 3.0 connector), or other wireless connector. Example wireline connectors include, for example, a IEEE FIREWIRE connector, a Universal Serial Bus (USB) connector (including a mini-B USB interface connector), a serial port connector, a parallel port connector, or other wireline connector. In another implementation, the functions of the network connection 606 and the antenna 605 are integrated into a single component.

The camera 607 allows the device 600 to capture digital images, and may be a scanner, a digital still camera, a digital video camera, other digital input device. In one example implementation, the camera 607 is a 3 mega-pixel (MP) camera that utilizes a complementary metal-oxide semiconductor (CMOS).

The microphone 609 allows the device 600 to capture sound, and may be an omni-directional microphone, a unidirectional microphone, a bi-directional microphone, or other type apparatus that converts sound to an electrical signal. The microphone 609 may be used to capture sound generated by a user, for example when the user is speaking to another user during a telephone call via the device 600. Conversely, the speaker 610 allows the device to convert an electrical signal into sound, such as a voice from another user generated by a telephone application program, or a ring tone generated from a ring tone application program. Furthermore, although the device 600 is illustrated in FIG. 6 as a handheld device, in further implementations the device 600 may be a laptop, a workstation, a midrange computer, a mainframe, an embedded system, telephone, desktop PC, a tablet computer, a PDA, or other type of computing device.

FIG. 7 is a block diagram illustrating an internal architecture 700 of the device 600. The architecture includes a central processing unit (CPU) 701 where the computer instructions that comprise an operating system or an application are processed; a display interface 702 that provides a communication interface and processing functions for rendering video, graphics, images, and texts on the display 601, provides a set of built-in controls (such as buttons, text and lists), and supports diverse screen sizes; a keyboard interface 704 that provides a communication interface to the keyboard 602; a pointing device interface 705 that provides a communication interface to the pointing device 604; an antenna interface 706 that provides a communication interface to the antenna 605; a network connection interface 707 that provides a communication interface to a network over the computer network connection 606; a camera interface 709 that provides a communication interface and processing functions for capturing digital images from the camera 607; a sound interface that provides a communication interface for converting sound into electrical signals using the microphone 609 and for converting electrical signals into sound using the speaker 610; a random access memory (RAM) 710 where computer instructions and data are stored in a volatile memory device for processing by the CPU 701; a read-only memory (ROM) 711 where invariant low-level systems code or data for basic system functions such as basic input and output (I/O), startup, or reception of keystrokes from the keyboard 602 are stored in a non-volatile memory device; a storage medium 712 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 714, application programs 715 (including, for example, a web browser application, a widget or gadget engine, and or other applications, as necessary) and data files 716 are stored; a power source 719 that provides an appropriate alternating current (AC) or direct current (DC) to power components; and a telephony subsystem 720 that allows the device 600 to transmit and receive sound over a telephone network. The constituent devices and the CPU 701 communicate with each other over a bus 721.

The CPU 701 is any appropriate computer processors. In one arrangement, the computer CPU 701 is more than one processing unit. The RAM 710 interfaces with the computer bus 721 so as to provide quick RAM storage to the CPU 701 during the execution of software programs such as the operating system application programs, and device drivers. More specifically, the CPU 701 loads computer-executable process steps from the storage medium 712 or other media into a field of the RAM 710 in order to execute software programs. Data is stored in the RAM 710, where the data is accessed by the computer CPU 701 during execution. In one example configuration, the device 600 includes at least 128 MB of RAM, and 256 MB of flash memory.

The storage medium 712 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 600 to access computer-executable process steps, application programs and the like, stored on removable and non-removable memory media, to off-load data from the device 600, or to upload data onto the device 600.

A computer program product is tangibly embodied in storage medium 712, a machine-readable storage medium. The computer program product includes instructions that, when read by a machine, operate to cause a data processing apparatus to download and store a digitally signed mobile application and other, additional dynamic information associated with the application. In some embodiments, the computer program product includes instructions that allow a mobile web browser to navigate to a web page associated with a particular domain distributing a particular mobile application, and request that the mobile application be downloaded from the web page. The computer program product may further include instructions that allow the mobile application to communicate with the domain associated with web page to download dynamic application data to the mobile device. Still further, the computer program product can include further instructions that allow the mobile application to access the dynamic application data without invalidating the application's digital signature.

The operating system 713 may be MICROSOFT WINDOWS NT/WINDOWS 2000/WINDOWS XP/WINDOWS MOBILE; SYMBIAN OS; a LINUX-based operating system such as the ANDROID mobile device operating system; APPLE MAC OS X; a variety of UNIX-flavored operating systems; or a proprietary operating system for computers or embedded systems. The application development platform or framework for the operating system 713 may be: BINARY RUNTIME ENVIRONMENT FOR WIRELESS (BREW); Symbian, JAVA Platform, Micro Edition (JAVA ME) or JAVA 2 Platform, Micro Edition (J2ME) using the SUN MICROSYSTEMS JAVASCRIPT programming language; PYTHON™, FLASH LITE, or MICROSOFT .NET Compact, or another appropriate environment.

The device stores computer-executable code for the operating system 713, and the application programs 715 such as an email, instant messaging, a video service application, word processing, spreadsheet, presentation, gaming, mapping, web browsing, JAVASCRIPT engine, or other applications. For example, one implementation may allow a user to access an email application, an instant messaging application, a video service application, a mapping application, or an imaging editing and presentation application. The application programs 715 may also include a widget or gadget engine, such as a TAFRI™ widget engine, a MICROSOFT gadget engine such as the WINDOWS SIDEBAR gadget engine or the KAPSULES™ gadget engine, a YAHOO! widget engine such as the KONFABULTOR™ widget engine, the APPLE DASHBOARD widget engine, the KLIPFOLIO widget engine, an OPERA™ widget engine, the WIDSETS™ widget engine, a proprietary widget or gadget engine, or other widget or gadget engine the provides host system software for a physically-inspired applet on a desktop.

A number of embodiments of the present disclosure have been described. Nevertheless, it will be understood that various modifications may be made without departing from the spirit and scope of the present disclosure. For example, various forms of the flows shown above may be used, with steps re-ordered, added, or removed. Also, although several types of mobile applications have been described, any appropriate mobile application is contemplated in the present disclosure. Accordingly, other embodiments are within the scope of the following claims.

What is claimed is:

1. A computer-implemented method performed by one or more processors for associating mobile application data with a mobile application, the method comprising:
   sending a request to a server from a digitally-signed mobile application stored at a mobile device, the digitally-signed mobile application being associated with a digital signature and an identifier, the request including information based at least in part on the identifier;
   receiving from the server, in response to the request, mobile application data at the mobile device, the mobile application data associated with the identifier;
   storing the received mobile application data separately from the digitally-signed mobile application at a memory of the mobile device; and
   providing the digitally-signed mobile application with access to the separately-stored mobile application data such that the digitally-signed mobile application is integrated with the mobile application data at runtime, where the digitally-signed mobile application is unmodified by the runtime integration with the mobile application data.

2. The method of claim 1, further comprising:
   deleting the identifier associated with the received mobile application data from the mobile device after the received mobile application data is stored on the mobile device.

3. The method of claim 1, wherein the mobile application data is associated with the identifier through a defined relationship at the server.

4. The method of claim 1, wherein integrating the mobile application data with the digitally-signed mobile application at runtime includes:
   presenting content associated with the received mobile application data during execution of the digitally-signed mobile application, where the content associated with the received mobile application data is not included in the installed digitally-signed mobile application.

5. The method of claim 1, wherein integrating the mobile application data with the digitally-signed mobile application at runtime includes:
   using the received mobile application data to modify at least one operation performed during execution of the digitally-signed mobile application.

6. The method of claim 1, wherein integrating the mobile application data with the digitally-signed mobile application at runtime includes:
   executing a software update of the digitally-signed mobile application at runtime, the software update included with the received mobile application data.

7. The method of claim 1, wherein the identifier associated with the digitally-signed mobile application on the mobile device includes a web browser cookie.

8. The method of claim 1, wherein installing the digitally-signed mobile application on the mobile device includes downloading the digitally-signed mobile application from the server using a web browser.

9. The method of claim 1, further comprising:
   prior to sending the request:
      downloading the digitally-signed mobile application from the server to the mobile device using a web browser; and
      storing the identifier associated with the digitally-signed mobile application on the mobile device, where the identifier includes a web browser cookie.

10. An article comprising a non-transitory computer readable medium storing instructions for causing one or more processors to perform operations comprising:
    sending a request to a server from a digitally-signed mobile application stored at a mobile device, the digitally-signed mobile application being associated with a digital signature and an identifier the request including information based at least in part on the identifier;
    receiving from the server, in response to the request, mobile application data at the mobile device, the mobile application data associated with the stored identifier;

storing the received mobile application data separately from the digitally-signed mobile application at a memory of the mobile device; and providing the digitally-signed mobile application with access to the separately-stored mobile application data such that the digitally-signed mobile application is integrated with the mobile application data at runtime, where the digitally-signed mobile application is unmodified by the runtime integration with the mobile application data.

11. The article of claim 10, wherein the mobile application data includes information associated with a distribution channel through which the mobile application was received prior to being installed.

12. The article of claim 10, wherein the mobile application data includes information associated with a location from which the mobile application was downloaded.

13. The article of claim 10, wherein integrating the mobile application data with the digitally-signed mobile application at runtime includes:

presenting content associated with the received mobile application data during execution of the digitally-signed mobile application, where the content associated with the received mobile application data is not included in the installed digitally-signed mobile application.

14. The article of claim 10, wherein integrating the mobile application data with the digitally-signed mobile application at runtime includes:

using the received mobile application data to modify at least one operation performed during execution of the digitally-signed mobile application.

15. The article of claim 10, wherein integrating the mobile application data with the digitally-signed mobile application at runtime includes:

executing a software update of the digitally-signed mobile application at runtime, the software update included with the received mobile application data.

16. The article of claim 10, wherein the medium storing instructions for causing one or more processors to perform further operations comprising:

prior to sending the request:
downloading the digitally-signed mobile application from the server to the mobile device; and
storing the associated identifier with the digitally-signed mobile application on the mobile device.

17. A system comprising:

a memory operable to store a digitally-signed mobile application associated with a digital signature and an identifier; and a processor coupled to the memory operable to:
send a request to a server from the digitally-signed mobile application, the request including information based at least in part on the identifier;
receive from the server, in response to the request, a set of dynamic mobile application data, the set of dynamic mobile application data associated with the identifier;
store the received dynamic mobile application data separately from the digitally-signed mobile application; and
provide the digitally-signed mobile application with access to the separately-stored mobile application data such that the digitally-signed mobile application is integrated with the mobile application data at runtime, where the digitally-signed mobile application is unmodified by the runtime integration with the mobile application data.

18. The system of claim 17, wherein integrating the received set of mobile application data with the digitally-signed mobile application at runtime includes:

presenting content associated with the received set of mobile application data during execution of the digitally-signed mobile application, where the content associated with the received set of mobile application data is not included in the installed digitally-signed mobile application.

19. The system of claim 17, wherein integrating the received set of mobile application data with the digitally-signed mobile application at runtime includes:

using the received set of mobile application data to modify at least one operation performed during execution of the digitally-signed mobile application.

20. The system of claim 17, wherein integrating the received set of mobile application data with the digitally-signed mobile application at runtime without includes:

executing a software update of the digitally-signed mobile application at runtime, the software update included with the received set of mobile application data.

* * * * *

UNITED STATES PATENT AND TRADEMARK OFFICE
CERTIFICATE OF CORRECTION

| | | |
|---|---|---|
| PATENT NO. | : 8,126,963 B1 | Page 1 of 1 |
| APPLICATION NO. | : 13/012709 | |
| DATED | : February 28, 2012 | |
| INVENTOR(S) | : Graeme Rimmer | |

It is certified that error appears in the above-identified patent and that said Letters Patent is hereby corrected as shown below:

In the claims:

Column 24, line 63, in Claim 10, delete "identifier" and insert -- identifier, --, therefor.

Column 26, line 40, in Claim 20, delete "runtime without" and insert -- runtime --, therefor.

Signed and Sealed this
Fifteenth Day of May, 2012

David J. Kappos
*Director of the United States Patent and Trademark Office*